May 15, 1923. 1,455,664
J. H. RUSSELL
HOUSEHOLD MIXING APPARATUS
Filed Sept. 1, 1920
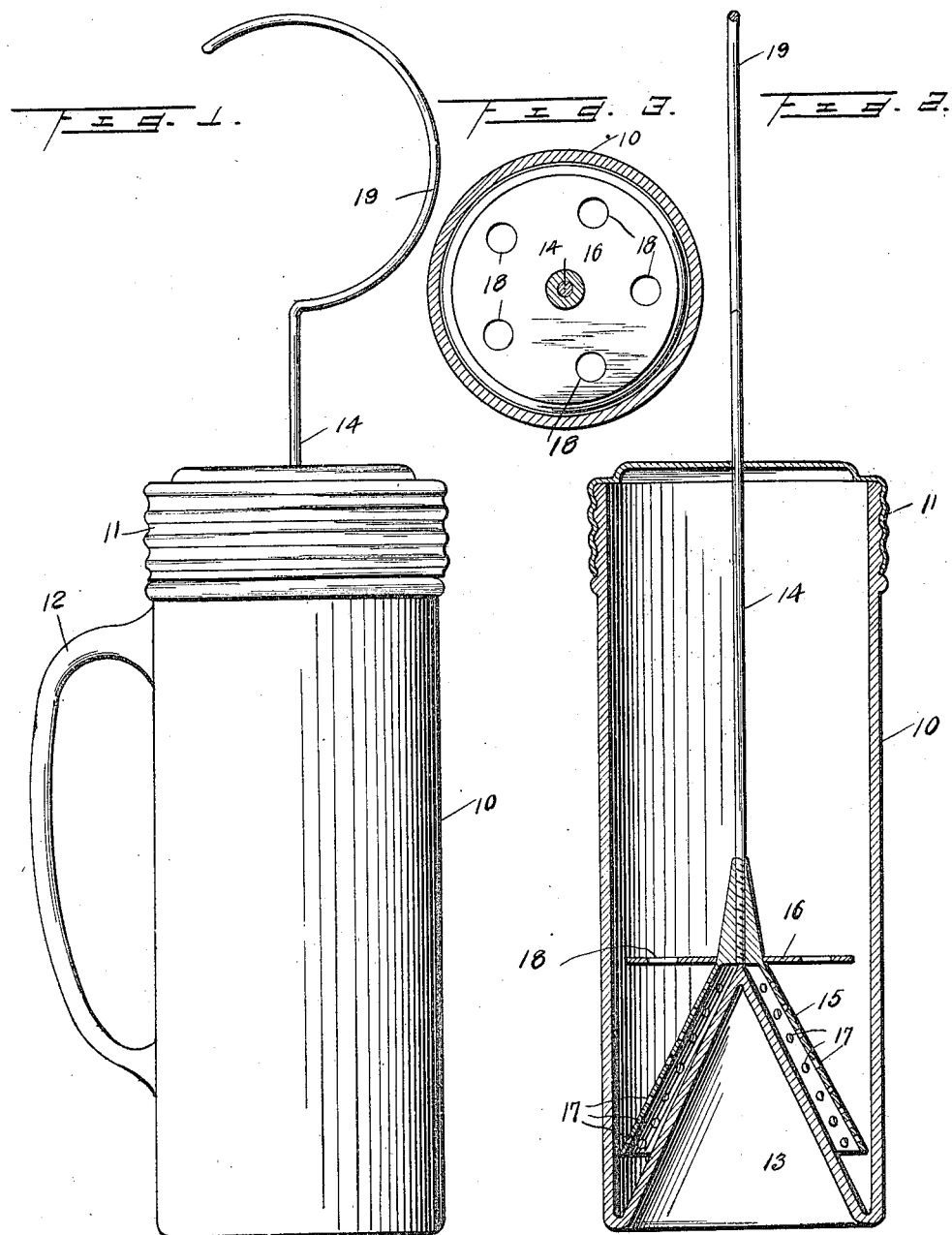
INVENTOR.
J. H. Russell.
BY
ATTORNEY.

Patented May 15, 1923.

1,455,664

UNITED STATES PATENT OFFICE.

JAMES H. RUSSELL, OF OKLAHOMA, OKLAHOMA.

HOUSEHOLD MIXING APPARATUS.

Application filed September 1, 1920. Serial No. 407,358.

*To all whom it may concern:*

Be it known that I, JAMES HENRY RUSSELL, a citizen of the United States, residing at Oklahoma city, in the county of Oklahoma and State of Oklahoma, have invented certain new and useful Improvements in Household Mixing Apparatus; and I do hereby declare the following to be a full, clear, and exact description of the invention, such as will enable others skilled in the art to which it appertains to make and use the same.

The object of the invention is to provide a mixing, beating, or agitating apparatus suitable for household use as for example in beating eggs, mixing dressings, working batter or dough for cake, whipping or beating cream or for churning milk, it being understood that its adaptability for different purposes and widely varying quantities of materials may be determined by the size or proportions of the same without departing from the principle of operation involved, and with this object in view the invention consists in a construction, combination and relation of parts of which a preferred embodiment is shown in the accompanying drawing, wherein:

Figure 1 is a side view of the apparatus.

Figure 2 is a vertical central sectional view of the same.

Figure 3 is a horizontal section showing the baffle disk in plan view.

The receptacle 10 may be of glass or like material fitted with a removable cap or cover 11 and a suitable handle 12, the bottom of the receptacle being of conical form as indicated at 13 and being imperforate.

Operating in the receptacle is a dasher provided with a stem 14 and consisting of a conical beating member 15 surmounted by a substantially flat baffling disk 16 arranged at or about the apex of the beating member, both beating member and baffling disk being perforated as shown respectively at 17 and 18.

The upper projecting end of the stem is preferably curved to form a substantially semi circular handle or grip 19 which will permit of stripping the cap or cover therefrom to disconnect the same from the dasher so that the latter may readily be cleansed and sterilized after use.

The conical beater member of the dasher is adapted to fit snugly over the conical imperforate bottom of the receptacle which constitutes a core to the end that material in the receptacle is forced by the downward movement of the dasher to penetrate or pass through the perforations of the beater member, and in this way the material is thrown forcibly against the under surface of the perforated baffling disk and further agitated while prevented from being thrown upward in the receptacle to such an extent as to involve the risk of being forced out of the receptacle through the joint between the cap or cover and the wall of the receptacle.

The operation of the dasher as will be understood violently agitates and divides the material so as to secure an effective aeration thereof.

Having thus described the invention, what I claim is:—

A device of the class described having a receptacle, a substantially conical member therein with its apex uppermost, a hollow dasher of substantially conical formation having an inner transverse wall to engage said apex and maintain the outer wall of the dasher in spaced relation to said conical member, a substantially conical attaching member on the dasher which said transverse wall constitutes its base, a perforated baffling plate on said substantially conical attaching member whereby it may be wedged in place against longitudinal movement thereon, and an operating stem secured to and extending from said attaching member.

In testimony whereof I affix my signature in presence of two witnesses.

JAMES H. RUSSELL.

Witnesses:
Mrs. ALICE CORDELL,
G. D. RUSSELL.